INVENTORS
GEORGE T. KEMP
NELSON N. ESTES
JAMES J. MOORE
BY
ATTORNEY united States Patent Office 3,056,908
Patented Oct. 2, 1962

3,056,908
ELECTROCHEMICAL DETECTOR
Nelson N. Estes, George T. Kemp, and James J. Moore, Austin, Tex., assignors to Union Carbide Corporation, a corporation of New York
Filed Nov. 28, 1958, Ser. No. 777,069
5 Claims. (Cl. 317—230)

This invention relates to an electrochemical detector and refers more particularly to an improved construction for such devices which improves their frequency response.

The basic principles of electrochemical detectors are given in a paper by Hurd and Lane, "Principles of Very Low Power Electrochemical Control Devices," Journal of the electrochemical Society, volume 104, No. 12, December 1957. One type of detector has the property that the electric current (or the voltage across a series resistance) in an external biasing circuit is directly proportional to the volume flow rate of fluid through the detecting element. This type is called an electrochemical linear detector. Those heretofore produced have been designed for operation for very near direct current operation.

Such devices generally comprise a housing divided into two compartments, one wall of each compartment having a flexible diaphragm therein. Each of the compartments contains a solution of an electrolyte comprising a reversible redox system, and in each compartment is an electrode inert to the solution therein. Mounted between the compartments is a plastic barrier having an orifice therein and in juxtaposition with the orifice is a detecting electrode usually composed of a plurality of pieces of platinum gauze.

When a voltage is applied across the electrodes in the compartments of the detector utilizing an electrolyte in the iodine-iodide system, iodine becomes concentrated in the anode compartment and virtually depleted in the cathode compartment. If fluid flows from the iodine-rich compartment to the iodine-poor compartment an electrical signal is produced at the detecting cathode. This signal is directly proportional to the magnitude of the flow. A flow of fluid may be caused, for instance, by the applictaion of a pressure on the diaphragm.

As stated above, these prior art devices were designed for very near direct current applications. It is desirable to have an electrochemical linear detector which will respond to pressure signals up to the order of 100 cycles per second. The prior art devices are not suitable for such use for a number of reasons among them being the fact that the diffusion time constant in the ion collecting region, that is, inside the detecting cathode, is far too high and the linear flow velocity past the detecting cathode is much too slow.

It is the principal object of the invention to provide an electrochemical detector capable of operation at high frequencies, for example, up to about 100 cycles per second. A more specific object is an electrochemical detector having an improved construction in the area of the detecting cathode which makes possible the use of the device at high frequencies.

These objects are achieved by the invention which will be described with reference to the accompanying drawing, in which.

Figure 1:
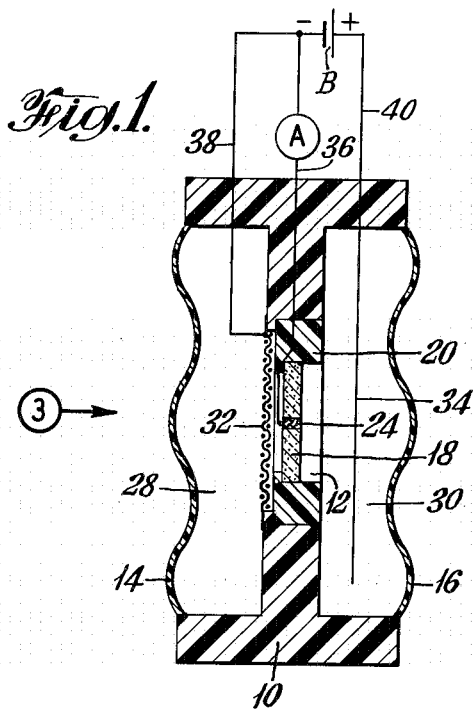
FIG. 1 is a vertical section of an electrochemical detector embodying the invention.
Figure 2:
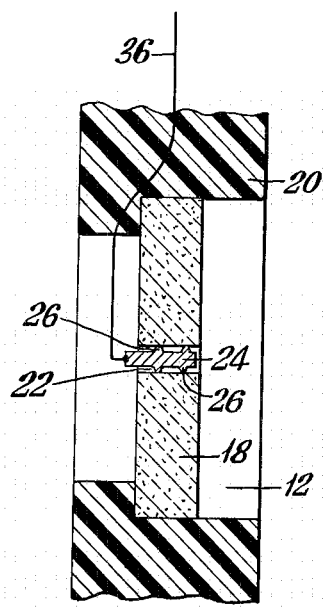
FIG. 2 is a greatly enlarged fragmentary section of the detecting cathode area of the detector of FIG. 1.
Figure 3:
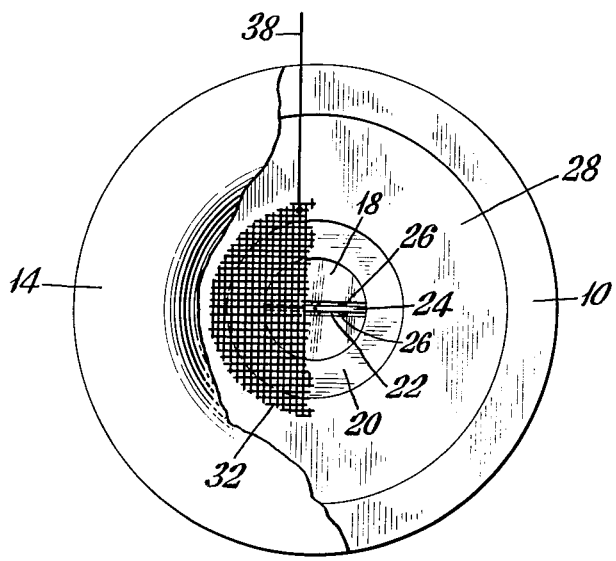
FIG. 3 is a plan view of the detector of FIG. 1, part being broken away to show details of construction.

The invention comprises an electrochemical detector having two compartments in a suitable housing. One wall of each compartment includes a flexible diaphragm, and the two compartments are separated by a porous disc having a slit therein in which is mounted a detecting cathode. Appropriate detectors are provided, one in each compartment, and each compartment contains a solution of a reversible redox system.

Referring now to the drawing, an electrochemical detector embodying the invention has a housing or main body section 10 which is generally T-shaped in section thus providing a central aperture 12 therein. Mounted on opposite ends of the main body section 10 and sealed thereto are flexible diaphragms 14, 16. A porous disc 18 suitably of porous glass is mounted in and sealed to a shouldered plastic ring 20 which in turn is sealed to the main body section 10 in the aperture 12. The disc 18 is provided with a slit 22 in which is mounted a detecting cathode 24 suitably of platinum. The cathode 24 is provided with a plurality of bosses 26 which serve to position the cathode in the slit 22 and prevent the same from closing.

It will be observed that the diaphragms 14, 16 and the disc 18 define two compartments 28, 30 communicating through the slit 22. The compartments 28, 30 are filled with a solution of electrolyte comprising a reversible redox system. As illustrated the compartment 28 is the cathode compartment. In it is mounted an electrode 32, suitably of platinum gauze and preferably mounted flush with the main body section 10 covering the aperture 12. In the anode compartment 30, a wire electrode 34 is provided. Each of the electrodes 24, 32, 34 is provided with a lead 36, 38, 40, the leads 38, 40 from the electrodes 32, 34 in the two compartments 28, 30 being connected across a source of biasing current such as a battery B in such manner that the electrode 32 is a cathode and the electrode 34 is an anode. The lead 36 from the detecting cathode 24 is connected to an ammeter which in turn is connected into the circuit to the lead 38.

The operation of the detector of the invention will be described with reference to use of an electrolyte in the iodine-iodine system for the sage of consciseness, although as will be pointed out below, other reversible redox systems may be used as electrolyte. In the iodine-iodine system, iodine dissolved in an aqueous solution of potassium iodide exists predominantly as the tri-iodide ion, $I_3^-$.

When a current is passed across the electrodes 32, 34 iodine is concentrated at the anode electrode 34 and is depleted at the cathode electrode 32 in accordance with the following equations.

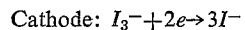
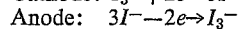

Cathode: $I_3^- + 2e \rightarrow 3I^-$
Anode: $3I^- - 2e \rightarrow I_3^-$

Thus a concentration of iodine is produced in the compartment 30 containing the anode electrode 34 while the iodine content in the compartment 28 containing the cathode electrode 32 is depleted. Due to the difference in iodine concentration existing in the two compartments there is a tendency for diffusion of iodine from the iodine-rich compartment 30 to the iodine-poor compartment 28 through the slit 22. This diffusion causes the detecting cathode 24 to produce a signal indicated on the ammeter, but this signal remains substantially constant. Any increase in fluid flow through the slit 22 caused, for instance, by the application of pressure on the diaphragm 16 of the anode compartment 30 will cause a proportional increase in the signal produced by the detecting cathode 24.

A number of detectors embodying the invention have been constructed utilizing glass discs, platinum electrodes and housings of polytrifluoromonochloroethylene. Their fabrication will now be described by way of illustration. A porous glass disc $5/16$ inch in diameter and $1/16$ inch thick was cut diametrically in half. The glass had a porosity of 25% and maximum pore diameter of 40 angstrom units. A strip of platinum 0.001 inch in thickness, having dimensions of the cut face of the disc and having a tab for connection of a lead wire thereto, was embossed to provide a plurality of bosses about 0.0004 inch in height projecting from each side thereof.

The platinum strip was then placed between the cut faces of the glass disc and the parts were placed in an annular ring of polytrifluoromonochloroethylene and heat-sealed thereto. The ring was of such diameter as to squeeze the two halves of the disc and the platinum strip together. The bosses on the platinum strip, however, serve to space the glass disc halves apart from each other and actually provide two slits for the passage of fluid.

The assembly so produced was then inserted in the central aperture of a plastic ring (polytrifluoromonochloroethylene) of the configuration shown in FIG. 1 and was heat-sealed thereto, a lead wire sealed in the housing being first connected to the tab of the platinum strip. Electrodes were then placed in position as shown in FIG. 1 and the housing for the detector was completed by the application of a pair of plastic diaphragms of the same material as the plastic ring, one diaphragm being heat-sealed to each side of the ring. The device was then evacuated and filled with an aqueous solution of potassium iodide containing iodine. The solution was 0.025 N in iodine and 0.5 N in potassium iodide.

With the construction just described the distance from any part of the solution in the collecting region (the slit) to the collecting surface (the detecting cathode) is reduced to a minimum. Since the diffusion time constant is proportional to the square of this distance, it is important that the distance be small in order to have a reasonable response at high frequencies. This is accomplished by the invention, and the devices embodying it are responsive at high frequencies whereas the prior art devices are not.

Furthermore the construction of the invention not only provides high linear flow velocity throughout the collecting region, but it provides extra current paths from the anode to both cathode elements without allowing significant fluid flow through these paths. Thereby the resistance is decreased without impairing detector sensitivity. Where a detector made in accordance with the prior art construction has a resistance of 300 to 400 ohms, one embodying the invention has a resistance of about 53 ohms. As the cathode entrance area is reduced, resistance tends to increase, but in the construction of the invention it increased to only about 75 ohms with a 0.5 N potassium iodide solution whereas in the prior art construction the resistance approaches infinity as the cathode entrance area is reduced.

It will be apparent to those skilled in the art that a number of different materials may be used in the detectors of the invention. For instance, for the electrolyte any reversible redox system may be used as already stated. In addition to the iodine-iodide system, the ferrocyanide-ferricyanide and cerouseric systems are suitable. The electrolyte is dissolved in a solvent; the requirements of the solvent are that it dissolve the measured specie of the redox system and permit one of the species to become ionized. Suitable solvents are alcohols, particularly methyl, ethyl, amyl, and butyl, with ethyl alcohol being preferred. Desirably, an alcohol-water mixture is employed.

The porous disc used is preferably of glass but other inert materials, for example, alumina, may be used provided their porosity is greater than 20% and their specific acoustic resistance exceeds $10^{10}$ c.g.s. units (gm. cm.$^{-6}$ sec.$^{-1}$).

Electrodes for use in the device of the invention must, of course, be inert to the liquids employed. Platinum is presently preferred for the electrode material but other noble metals, for example, iridium, palladium and rhodium or alloys thereof with each other or platinum may be used. Pyrolytic carbon electrodes of the type disclosed in the application of G. E. Evans, R. A. Powers, N. N. Estes and E. S. Snavely, Jr., Ser. No. 777,012, filed concurrently herewith, may be used.

The plastic used for the housing and other parts of the device of the invention should be inert to the materials used and should have some degree of resilience. Depending upon the liquids used, nylon, polyethylene, polymethyl methacrylate, or vinylidene plastics may be used. It is also within the scope of the invention that glass be used for the housing.

The detecting cathode in the device of the invention may be formed in situ by deposition of a thin layer of metan on one face of the slit. Proper spacing may then be attained by providing bosses on at least one face of the slit.

Other modifications within the scope of the invention will occur to those skilled in the art.

We claim:

1. An electrochemical detector comprising a housing divided into a pair of compartments, one wall of each of which has a flexible diaphragm therein, each of said compartments containing an electrolyte solution comprising a reversible redox system; an electrode in each of said compartments; a porous disc mounted between said compartments; a slit in said disc permitting fluid flow therethrough; and a detecting cathode in said slit.

2. A detector as defined by claim 1 in which said disc is porous glass.

3. A detector as defined by claim 2 in which said detecting cathode is platinum.

4. A detector as defined by claim 3 in which said detecting cathode is a strip of platinum having a plurality of bosses on both sides thereof.

5. A detector as defined by claim 4 in which said reversible redox system is the iodine-iodide system.

References Cited in the file of this patent

UNITED STATES PATENTS

| 2,685,025 | Root | July 27, 1954 |
| 2,824,292 | Christoph | Feb. 18, 1958 |
| 2,890,414 | Snavely | July 9, 1959 |

OTHER REFERENCES

Publication: "Electrochemical Transducers," "Solions," Machine Design, vol. 29, August 22, 1957, pages 102–105.

UNITED STATES PATENT OFFICE
CERTIFICATE OF CORRECTION

Patent No. 3,056,908                  October 2, 1962

Nelson N. Estes et al.

It is hereby certified that error appears in the above numbered patent requiring correction and that the said Letters Patent should read as corrected below.

Column 1, line 16, for "electrochemical" read -- Electrochemical --; column 2, lines 39 and 40, for "iodine-iodine" read -- iodine-iodide --; line 40, for "sage" read -- sake --; line 42, for "iodine-iodine" read -- iodine-iodide --.

Signed and sealed this 26th day of March 1963.

(SEAL)
Attest:

ESTON G. JOHNSON

Attesting Officer

DAVID L. LADD

Commissioner of Patents